United States Patent
Zhang et al.

(10) Patent No.: US 11,229,903 B1
(45) Date of Patent: Jan. 25, 2022

(54) HYDROISOMERIZATION CATALYST WITH IMPROVED THERMAL STABILITY

(71) Applicant: Chevron U.S.A. Inc., San Ramon, CA (US)

(72) Inventors: Yihua Zhang, Albany, CA (US); Adeola Florence Ojo, Pleasant Hill, CA (US); Guan-Dao Lei, Walnut Creek, CA (US)

(73) Assignee: Chevorn U.S.A. Inc., San Ramon, CA (US)

( * ) Notice: Subject to any disclaimer, the term of this patent is extended or adjusted under 35 U.S.C. 154(b) by 0 days.

(21) Appl. No.: 17/138,068

(22) Filed: Dec. 30, 2020

(51) Int. Cl.

| | |
|---|---|
| *B01J 29/70* | (2006.01) |
| *B01J 37/04* | (2006.01) |
| *C10G 45/64* | (2006.01) |
| *B01J 21/04* | (2006.01) |
| *B01J 23/10* | (2006.01) |
| *B01J 23/89* | (2006.01) |
| *B01J 23/83* | (2006.01) |
| *B01J 23/63* | (2006.01) |
| *B01J 35/02* | (2006.01) |
| *B01J 37/08* | (2006.01) |

(52) U.S. Cl.
CPC ............ *B01J 37/04* (2013.01); *B01J 21/04* (2013.01); *B01J 23/10* (2013.01); *B01J 23/63* (2013.01); *B01J 23/83* (2013.01); *B01J 23/894* (2013.01); *C10G 45/64* (2013.01); *B01J 29/708* (2013.01); *B01J 35/026* (2013.01); *B01J 37/08* (2013.01)

(58) Field of Classification Search
CPC ... B01J 21/04; B01J 23/10; B01J 23/63; B01J 23/83; B01J 23/894; B01J 37/04; C10G 45/64

See application file for complete search history.

(56) References Cited

U.S. PATENT DOCUMENTS

| | | | |
|---|---|---|---|
| 3,852,207 A | 12/1974 | Stangeland et al. | |
| 4,673,487 A | 6/1987 | Miller | |
| 5,135,638 A | 8/1992 | Miller | |
| 5,282,958 A | 2/1994 | Santilli et al. | |
| 5,736,482 A * | 4/1998 | Durand | B01J 23/83 502/303 |
| 6,790,433 B2 | 9/2004 | Chen et al. | |
| 7,282,134 B2 | 10/2007 | Abernathy et al. | |

(Continued)

FOREIGN PATENT DOCUMENTS

| | | |
|---|---|---|
| CN | 110102338 A * | 8/2019 |
| WO | 2017/034823 A1 | 3/2017 |

OTHER PUBLICATIONS

U.S. Appl. No. 17/095,010; Yihua ZHANG, filed Nov. 11, 2020.

*Primary Examiner* — David M Brunsman
(74) *Attorney, Agent, or Firm* — Mark Warzel

(57) ABSTRACT

A method for making a hydroisomerization catalyst having improved thermal stability and metal dispersion characteristics, the catalyst prepared therefrom, and a process for making a base oil product using the catalyst are disclosed. The catalyst is prepared from a composition comprising an SSZ-91 molecular sieve and a rare earth modified alumina, with the composition being modified to contain a Group 8-10 metal, typically through impregnation of a Group 8-10 metal composition. The catalyst may be used to produce dewaxed base oil products by contacting the catalyst under hydroisomerization conditions with a hydrocarbon feedstock.

21 Claims, 1 Drawing Sheet

(56) References Cited

U.S. PATENT DOCUMENTS

| | | | |
|---|---|---|---|
| 9,802,830 B2 | 10/2017 | Ojo et al. | |
| 9,920,260 B2 | 3/2018 | Ojo et al. | |
| 9,984,314 B2* | 5/2018 | Philipose | G06N 3/08 |
| 10,618,816 B2 | 4/2020 | Ojo et al. | |
| 11,001,502 B2* | 5/2021 | Ojo | B01J 29/7446 |
| 2007/0129234 A1* | 6/2007 | Stockwell | B01D 53/864 |
| | | | 502/34 |

* cited by examiner

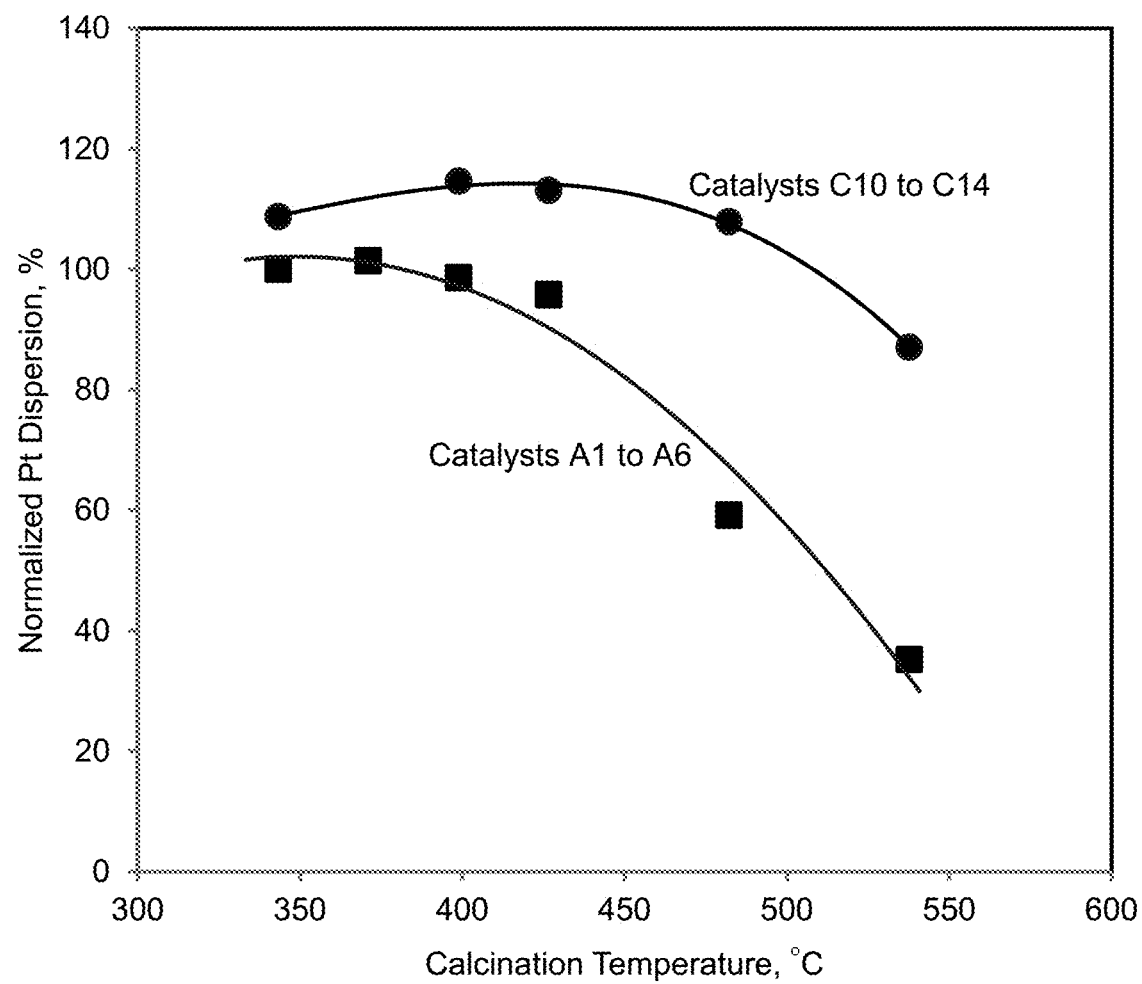

HYDROISOMERIZATION CATALYST WITH IMPROVED THERMAL STABILITY

FIELD OF THE INVENTION

A hydroisomerization catalyst and process having improved thermal stability, which is useful for producing base oils from hydrocarbon feedstocks.

BACKGROUND OF THE INVENTION

A hydroisomerization catalytic dewaxing process for the production of base oils from a hydrocarbon feedstock involves introducing the feed into a reactor containing a dewaxing catalyst system in the presence of hydrogen. Within the reactor, the feed contacts the hydroisomerization catalyst under hydroisomerization dewaxing conditions to provide an isomerized stream. Hydroisomerization removes aromatics and residual nitrogen and sulfur and isomerize the normal paraffins to improve the base oil cold properties. The isomerized stream may be further contacted in a second reactor with a hydrofinishing catalyst to remove traces of any aromatics, olefins, improve color, and the like from the base oil product. The hydrofinishing unit may include a hydrofinishing catalyst comprising an alumina support and a noble metal, typically palladium, or platinum in combination with palladium.

The challenges generally faced in typical hydroisomerization catalytic dewaxing processes include, among others, providing product(s) that meet pertinent product specifications, such as cloud point, pour point, viscosity and/or viscosity index limits for one or more products, while also maintaining good product yield. In addition, further upgrading, e.g., during hydrofinishing, to further improve product quality may be used, e.g., for color and oxidation stability by saturating aromatics to reduce the aromatics content. The presence of residual organic sulfur and nitrogen from upstream hydrotreatment and hydrocracking processes, however, may have a significant impact on downstream processes and final base oil product quality.

Hydrodewaxing of straight chain paraffins involves a number of hydroconversion reactions, including hydroisomerization, redistribution of branches, and secondary hydroisomerization. Consecutive hydroisomerization reactions lead to an increased degree of branching accompanied by a redistribution of branches. Increased branching generally increases the probability of chain cracking, leading to greater fuels yield and a loss of base oil/lube yield. Minimizing such reactions, including the formation of hydroisomerization transition species, can therefore lead to increased base oil/lube yield.

It is further believed that excessive chain cracking may be reduced, and isomerization activity increased, through improved noble metal dispersion and catalyst thermal stability. Catalyst aging performance (durability) may thereby be improved as well, so that such catalysts may demonstrate increased lifecycle time, leading to extended lifecycle product yield improvements.

A more robust catalyst for base oil/lube production is therefore needed to isomerize wax molecules using catalysts that reduce undesired cracking and hydroisomerization reactions and to provide improved metal dispersion and thermal stability of the catalyst. Accordingly, a continuing need exists for catalysts, catalyst systems, methods and processes to produce such catalysts, as well as base oil/lube products produced through the use of such catalysts.

BRIEF DESCRIPTION OF THE FIGURES

FIG. 1 shows the normalized platinum dispersion for catalysts described in the examples.

SUMMARY OF THE INVENTION

This invention relates to a method for making a hydroisomerization catalyst, the catalyst made therefrom, and a process for converting wax-containing hydrocarbon feedstocks into high-grade products, including base or lube oils. The method and the catalyst made therefrom employ a catalyst composition comprising an SSZ-91 molecular sieve and a rare earth modified alumina. The catalyst made according to the method is generally used in a hydroisomerization process by providing an appropriate hydrocarbon feedstock and contacting the catalyst with the feedstock to provide a hydrodewaxed product. The hydroisomerization process converts aliphatic, unbranched paraffinic hydrocarbons (n-paraffins) to iso-paraffins and cyclic species, thereby decreasing the pour point and cloud point of the base oil product as compared with the feedstock. Catalysts formed from the combination of SSZ-91 molecular sieve and a rare earth modified alumina have been found to advantageously possess improved metal dispersion and thermal stability characteristics as compared with catalysts produced using SSZ-91 catalysts by themselves without the addition of the rare earth modified alumina. In some cases, the finished hydroisomerization catalyst is particularly well-suited for hydroprocessing feedstocks to produce base oil products.

In one aspect, the present invention is directed to a method for making a hydroisomerization catalyst, which is useful to make dewaxed products including base oils through hydroprocessing of a suitable hydrocarbon feedstream. While not necessarily limited thereto, one of the goals of the invention is to provide a hydroisomerization catalyst having improved thermal stability characteristics, including, e.g., improved metal dispersion within the catalyst. Such beneficial characteristics generally lead to improved catalyst performance and extend the catalyst lifetime during use in a hydroisomerization process.

The method for making the hydroisomerization catalyst composition generally comprises mixing an SSZ-91 molecular sieve and a rare earth modified alumina, forming a shaped particulate material from the mixture, drying and calcining the particulate, impregnating the calcined particulate with a Group 8-10 metal to form a catalyst precursor, and drying and calcining the catalyst precursor to form the catalyst. A matrix material and at least one modifier selected from Groups 6 to 10 and Group 14 of the Periodic Table may also be used to prepare the catalyst composition. The modifier may further comprise a Group 2 metal.

The process of using the catalyst in a hydroisomerization process generally comprises contacting a hydrocarbon feedstock with the hydroisomerization catalyst under hydroisomerization conditions to produce a base oil product or product stream. The product from the hydroisomerization catalyst may itself be a base oil product, or may be used to make a base oil product.

DETAILED DESCRIPTION

Although illustrative embodiments of one or more aspects are provided herein, the disclosed processes may be implemented using any number of techniques. The disclosure is not limited to the illustrative or specific embodiments, drawings, and techniques illustrated herein, including any exemplary designs and embodiments illustrated and described herein, and may be modified within the scope of the appended claims along with their full scope of equivalents.

Unless otherwise indicated, the following terms, terminology, and definitions are applicable to this disclosure. If a term is used in this disclosure but is not specifically defined herein, the definition from the IUPAC Compendium of Chemical Terminology, 2nd ed (1997), may be applied, provided that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein is to be understood to apply.

"API gravity" refers to the gravity of a petroleum feedstock or product relative to water, as determined by ASTM D4052-11.

"Viscosity index" (VI) represents the temperature dependency of a lubricant, as determined by ASTM D2270-10 (E2011).

"Vacuum gas oil" (VGO) is a byproduct of crude oil vacuum distillation that can be sent to a hydroprocessing unit or to an aromatic extraction for upgrading into base oils. VGO generally comprises hydrocarbons with a boiling range distribution between 343° C. (649° F.) and 593° C. (1100° F.) at 0.101 MPa.

"Treatment," "treated," "upgrade," "upgrading" and "upgraded," when used in conjunction with an oil feedstock, describes a feedstock that is being or has been subjected to hydroprocessing, or a resulting material or crude product, having a reduction in the molecular weight of the feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

"Hydroprocessing" refers to a process in which a carbonaceous feedstock is brought into contact with hydrogen and a catalyst, at a higher temperature and pressure, for the purpose of removing undesirable impurities and/or converting the feedstock to a desired product. Examples of hydroprocessing processes include hydrocracking, hydrotreating, catalytic dewaxing, and hydrofinishing.

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins (naphthenes) into non-cyclic branched paraffins.

"Hydrotreating" refers to a process that converts sulfur and/or nitrogen-containing hydrocarbon feeds into hydrocarbon products with reduced sulfur and/or nitrogen content, typically in conjunction with hydrocracking, and which generates hydrogen sulfide and/or ammonia (respectively) as byproducts. Such processes or steps performed in the presence of hydrogen include hydrodesulfurization, hydrodenitrogenation, hydrodemetallation, and/or hydrodearomatization of components (e.g., impurities) of a hydrocarbon feedstock, and/or for the hydrogenation of unsaturated compounds in the feedstock. Depending on the type of hydrotreating and the reaction conditions, products of hydrotreating processes may have improved viscosities, viscosity indices, saturates content, low temperature properties, volatilities and depolarization, for example. The terms "guard layer" and "guard bed" may be used herein synonymously and interchangeably to refer to a hydrotreating catalyst or hydrotreating catalyst layer. The guard layer may be a component of a catalyst system for hydrocarbon dewaxing, and may be disposed upstream from at least one hydroisomerization catalyst.

"Catalytic dewaxing", or hydroisomerization, refers to a process in which normal paraffins are isomerized to their more branched counterparts by contact with a catalyst in the presence of hydrogen.

"Hydrofinishing" refers to a process that is intended to improve the oxidation stability, UV stability, and appearance of the hydrofinished product by removing traces of aromatics, olefins, color bodies, and solvents. UV stability refers to the stability of the hydrocarbon being tested when exposed to UV light and oxygen. Instability is indicated when a visible precipitate forms, usually seen as Hoc or cloudiness, or a darker color develops upon exposure to ultraviolet light and air. A general description of hydrofinishing may be found in U.S. Pat. Nos. 3,852,207 and 4,673,487.

The term "Hydrogen" or "hydrogen" refers to hydrogen itself, and/or a compound or compounds that provide a source of hydrogen.

"Cut point" refers to the temperature on a True Boiling Point (TBP) curve at which a predetermined degree of separation is reached.

"Pour point" refers to the temperature at which an oil will begin to flow under controlled conditions. The pour point may be determined by, for example, ASTM D5950.

"Cloud point" refers to the temperature at which a lube base oil sample begins to develop a haze as the oil is cooled under specified conditions. The cloud point of a lube base oil is complementary to its pour point. Cloud point may be determined by, for example, ASTM D5773.

"TBP" refers to the boiling point of a hydrocarbonaceous feed or product, as determined by Simulated Distillation (SimDist) by ASTM D2887-13.

"Hydrocarbonaceous", "hydrocarbon" and similar terms refer to a compound containing only carbon and hydrogen atoms. Other identifiers may be used to indicate the presence of particular groups, if any, in the hydrocarbon (e.g., halogenated hydrocarbon indicates the presence of one or more halogen atoms replacing an equivalent number of hydrogen atoms in the hydrocarbon).

The term "Periodic Table" refers to the version of the IUPAC Periodic Table of the Elements dated Jun. 22, 2007, and the numbering scheme for the Periodic Table Groups is as described in Chem. Eng. News, 63(5), 26-27 (1985). "Group 2" refers to IUPAC Group 2 elements, e.g., magnesium, (Mg), Calcium (Ca), Strontium (Sr), Barium (Ba) and combinations thereof in any of their elemental, compound, or ionic form. "Group 6" refers to IUPAC Group 6 elements, e.g., chromium (Cr), molybdenum (Mo), and tungsten (W). "Group 7" refers to IUPAC Group 7 elements, e.g., manganese (Mn), rhenium (Re) and combinations thereof in any of their elemental, compound, or ionic form. "Group 8" refers to IUPAC Group 8 elements, e.g., iron (Fe), ruthenium (Ru), osmium (Os) and combinations thereof in any of their elemental, compound, or ionic form. "Group 9" refers to IUPAC Group 9 elements, e.g., cobalt (Co), rhodium (Rh), iridium (Ir) and combinations thereof in any of their elemental, compound, or ionic form. "Group 10" refers to IUPAC Group 10 elements, e.g., nickel (Ni), palladium (Pd), platinum (Pt) and combinations thereof in any of their elemental, compound, or ionic form. "Group 14" refers to IUPAC Group 14 elements, e.g., germanium (Ge), tin (Sn), lead (Pb) and combinations thereof in any of their elemental, compound, or ionic form.

The term "support", particularly as used in the term "catalyst support", refers to conventional materials that are typically a solid with a high surface area, to which catalyst materials are affixed. Support materials may be inert or participate in the catalytic reactions, and may be porous or non-porous. Typical catalyst supports include various kinds of carbon, alumina, silica, and silica-alumina, e.g., amorphous silica aluminates, zeolites, alumina-boria, silica-alumina-magnesia, silica-alumina-titania and materials obtained by adding other zeolites and other complex oxides thereto.

"Molecular sieve" refers to a material having uniform pores of molecular dimensions within a framework structure, such that only certain molecules, depending on the type of molecular sieve, have access to the pore structure of the molecular sieve, while other molecules are excluded, e.g., due to molecular size and/or reactivity. The term "molecular sieve" and "zeolite" are synonymous and include (a) intermediate and (b) final or target molecular sieves and molecular sieves produced by (1) direct synthesis or (2) post-crystallization treatment (secondary modification). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433. Zeolites, crystalline aluminophosphates and crystalline silicoaluminophosphates are representative examples of molecular sieves.

In this disclosure, while compositions and methods or processes are often described in terms of "comprising" various components or steps, the compositions and methods may also "consist essentially of" or "consist of" the various components or steps, unless stated otherwise.

The terms "a," "an," and "the" are intended to include plural alternatives, e.g., at least one. For instance, the disclosure of "a transition metal" or "an alkali metal" is meant to encompass one, or mixtures or combinations of more than one, transition metal or alkali metal, unless otherwise specified.

All numerical values within the detailed description and the claims herein are modified by "about" or "approximately" the indicated value, and take into account experimental error and variations that would be expected by a person having ordinary skill in the art.

In one aspect, the present invention is a method for making a hydroisomerization catalyst, and the catalyst formed therefrom, the catalyst being useful to make dewaxed products including base and lube oils. The hydroisomerization catalyst composition generally comprises an SSZ-91 molecular sieve and a rare earth modified, optionally along with other components, including, e.g., matrix (support) materials. The catalyst composition is modified with a Group 8-10 metal and may also include at least one modifier selected from Groups 6 to 10 and Group 14 of the Periodic Table. The modifier may further comprise a Group 2 metal of the Periodic Table.

The method of making the hydroisomerization catalyst comprises: mixing an SSZ-91 molecular sieve with a rare earth metal modified alumina and, optionally, a refractory inorganic oxide carrier precursor, to form a mixture. The mixture generally has an SSZ-91 molecular sieve content in the range of about 5 to about 80 wt. % and is formed into a shaped particulate material, dried and calcined. The calcined particulate material is further contacted with a solution comprising a Group 8-10 metal compound to form a catalyst precursor material, followed by drying of the catalyst precursor material and calcination of the dried catalyst precursor material to form the hydroisomerization catalyst.

In a further aspect, the present invention concerns a hydroisomerization process, useful to make dewaxed products including base oils, the process comprising contacting a hydrocarbon feedstock with the hydroisomerization catalyst under hydroisomerization conditions to produce a base oil product or product stream. The feedstock may be first contacted with the hydroisomerization catalyst composition to provide a first product followed by contacting the first product with one or more other catalyst compositions as needed to produce a second product. Alternatively, a hydrocarbon feedstock may be first contacted with such other catalyst compositions as needed, followed by contacting one or more product streams therefrom with the hydroisomerization catalyst. The products from such arrangements may themselves be a base oil product, or may be used to make a base oil product.

The SSZ-91 molecular sieve used in the hydroisomerization catalyst system and process is described in, e.g., U.S. Pat. Nos. 9,802,830; 9,920,260; 10,618,816; and in WO2017/034823. The SSZ-91 molecular sieve generally comprises ZSM-48 type zeolite material, the molecular sieve having at least 70% polytype 6 of the total ZSM-48-type material; an EUO-type phase in an amount of between 0 and 3.5 percent by weight; and polycrystalline aggregate morphology comprising crystallites having an average aspect ratio of between 1 and 8. The silicon oxide to aluminum oxide mole ratio of the SSZ-91 molecular sieve may be in the range of 40 to 220 or 50 to 220 or 40 to 200. In some cases, the SSZ-91 molecular sieve may have at least 70% polytype 6 of the total ZSM-48-type material; an EUO-type phase in an amount of between 0 and 3.5 percent by weight; and polycrystalline aggregate morphology comprising crystallites having an average aspect ratio of between 1 and 8. In some cases, the SSZ-91 material is composed of at least 90% polytype 6 of the total ZSM-48-type material present in the product. The polytype 6 structure has been given the framework code *MRE by the Structure Commission of the International Zeolite Association. The term "*MRE-type molecular sieve" and "EUO-type molecular sieve" includes all molecular sieves and their isotypes that have been assigned the International Zeolite Association framework, as described in the *Atlas of Zeolite Framework Types*, eds. Ch. Baerlocher, L. B. Mccusker and D. H. Olson, Elsevier, 6th revised edition, 2007 and the Database of Zeolite Structures on the International Zeolite Association's website (http://www.iza-online.org).

The foregoing noted patents provide additional details concerning SSZ-91 molecular sieves, methods for their preparation, and catalysts formed therefrom.

The rare earth modified alumina may generally be modified with one or more rare metals selected from lanthanum, cerium, praseodymium, neodymium, promethium, samarium, europium, gadolinium, terbium, dysprosium, holmium, erbium, thulium, ytterbium, lutetium, scandium, yttrium, or a combination thereof. In particular cases, the rare earth modified alumina is an alumina selected from boehmite, pseudoboehmite, γ-alumina, θ-alumina, or a mixture thereof, wherein the rare earth modifier comprises lanthanum. In general, the rare earth metal content is in the range of about 1-20 wt. % or 1.5-15 wt. % or 2-10 wt. %.

The rare earth modified alumina may be made according to methods know in the art, or may be obtained from commercial sources (e.g., Sasol, Kaiyong, PIDC). Suitable methods of making rare earth modified aluminum materials and related general information are disclosed in U.S. Pat. No. 7,163,963 and similar patents. For example, a rare-earth metal compound may be applied on an aluminum-comprising material by kneading the rare-earth metal compound with the aluminum-comprising material, or alternatively, by applying a solution of the rare-earth metal compound to the aluminum-comprising material, thereby forming a rare earth-modified alumina precursor. More than one rare earth metal compound can be applied to the aluminum-containing compound in the same application step or in different application steps to prepare the catalyst.

The rare-earth metal compounds may be salts that comprise a rare-earth metal cation and a counterion, such as the anion and any hydrated form of the anion. Examples include: nitrate, any alkanoate such as octanoate, oxalate, carbonate, acetate, acetylacetonate, any halide, and sulfate. Suitable rare-earth metal compounds include compounds of rare-earth elements soluble in a suitable solvent such as water, or an organic solvent like toluene, methanol, acetone, ethanol, or mixtures thereof. In some cases, the rare-earth element may be water soluble. Suitable compounds may also comprise the hydrated nitrate salts of a rare-earth metal. Although any one or combination of the rare earth elements may comprise the rare earth compound, at least one metal of the compound may be trivalent, and, in some cases, selected from the group consisting of yttrium, lanthanum, praseodymium, neodymium, samarium, and gadolinium.

Although any suitable method may be used to apply the rare earth metal compound, in some cases, impregnation is a particularly useful method. Impregnation can be performed under ambient pressure or below ambient (i.e., under sub-ambient) pressure, with incipient wetness impregnation being a particularly useful technique. Other impregnation techniques from known suitable techniques may be used as well.

The rare earth modified alumina support is dried under suitable conditions to yield a dried rare earth modified alumina precursor. Drying conditions are sufficient for driving off essentially all of the solvent or solvents used in the previous application step, and typically include a drying temperature of at least 80° C. Further calcination of the catalyst support comprising the dried rare earth modified alumina precursor may also be used in a manner effective for creating a surface coverage comprising an oxide of the rare earth metal. Typical calcining conditions will be effective for converting the rare earth metal compound into an oxide of the rare earth metal, and decomposing and/or, in the case of a salt, removing the counterion of the rare-earth metal compound. In some cases, the dried rare earth modified alumina precursor is calcined in an oxidizing, reducing or inert (e.g., nitrogen, helium, or argon) atmosphere at a temperature between about 800° C. and about 1400° C., more particularly between about 900° C. and about 1300° C., or between about 1000° C. and about 1300° C. Oxidizing conditions may be preferred in some cases. Calcination conditions to coat the alumina at least partially, or completely, with a surface coverage of the rare earth oxide may also be preferred. While not limited thereto, the rare earth metal surface coverage may advantageously be between about 0.2 nm and about 0.5 nm in thickness.

The alumina used in the rare earth modified alumina may generally possess beneficial characteristics, including, e.g., surface area and pore structure and/or volume. For example, the rare earth metal modified alumina may have a surface area in the range of 100-300 $m^2/g$, or 110-250 $m^2/g$, or 120-200 $m^2/g$, and/or a pore volume in the range of 2.5-105 nm pore diameter range of 0.6-2.0 cc/g, or 0.65-1.8 cc/g, or 0.7-1.5 cc/g, or a combination thereof. In some cases, the modified alumina may a lanthanum modified alumina having surface area and pore diameter characteristics within the foregoing ranges.

The SSZ-91 molecular sieve and rare earth modified alumina catalyst composition may also be combined with a matrix material to form a base material composition. The base material may, e.g., be formed as a base extrudate by combining the molecular sieve and rare earth modified alumina with the matrix material, extruding the mixture to form shaped extrudates, followed by drying and calcining of the extrudate. The catalyst composition also typically further comprises at least one modifier selected from Groups 6 to 10 and Group 14, and optionally further comprising a Group 2 metal, of the Periodic Table. Modifiers may be added through the use of impregnation solutions comprising modifier compounds.

Suitable matrix materials for the catalyst composition include alumina, silica, ceria, titania, tungsten oxide, zirconia, or a combination thereof. In some embodiments, aluminas for the catalyst compositions and the process may also be a "high nanopore volume" alumina, abbreviated as "HNPV" alumina, as described in U.S. application Ser. No. 17/095,010, filed on Nov. 11, 2020, herein incorporated by reference. Suitable aluminas are commercially available, including, e.g., Catapal® aluminas and Pural® aluminas from Sasol or Versal® aluminas from UOP. In general, the alumina can be any alumina known for use as a matrix material in a catalyst base. For example, the alumina can be boehmite, bayerite, γ-alumina, η-alumina, θ-alumina, δ-alumina, χ-alumina, or a mixture thereof.

Suitable modifiers are selected from Groups 6-10 and Group 14 of the Periodic Table (IUPAC). Suitable Group 6 modifiers include Group 6 elements, e.g., chromium (Cr), molybdenum (Mo), and tungsten (W) and combinations thereof in any of their elemental, compound, or ionic form. Suitable Group 7 modifiers include Group 7 elements, e.g., manganese (Mn), rhenium (Re) and combinations thereof in any of their elemental, compound, or ionic form. Suitable Group 8 modifiers include Group 8 elements, e.g., iron (Fe), ruthenium (Ru), osmium (Os) and combinations thereof in any of their elemental, compound, or ionic form. Suitable Group 9 modifiers include Group 9 elements, e.g., cobalt (Co), rhodium (Rh), iridium (Ir) and combinations thereof in any of their elemental, compound, or ionic form. Suitable Group 10 modifiers include Group 10 elements, e.g., nickel (Ni), palladium (Pd), platinum (Pt) and combinations thereof in any of their elemental, compound, or ionic form. Suitable Group 14 modifiers include Group 14 elements, e.g., germanium (Ge), tin (Sn), lead (Pb) and combinations thereof in any of their elemental, compound, or ionic form. In addition, optional Group 2 modifiers may be present, including Group 2 elements, e.g., magnesium, (Mg), Calcium (Ca), Strontium (Sr), Barium (Ba) and combinations thereof in any of their elemental, compound, or ionic form.

The modifier advantageously comprises one or more Group 10 metals. The Group 10 metal may be, e.g., platinum, palladium or a combination thereof. Platinum is a suitable Group 10 metal along with another Groups 6 to 10 and Group 14 metal in some aspects. While not limited thereto, the Groups 6 to 10 and Group 14 metal may be more narrowly selected from Pt, Pd, Ni, Re, Ru, Ir, Sn, or a combination thereof. In conjunction with Pt as a first metal in the first and/or second catalyst compositions, an optional second metal in the catalyst composition may also be more narrowly selected from the Groups 6 to 10 and Group 14 metals, such as, e.g., Pd, Ni, Re, Ru, Ir, Sn, or a combination thereof. In a more specific instance, the catalyst may comprise Pt as a Group 10 metal in an amount of 0.01-5.0 wt. % or 0.01-2.0 wt. %, or 0.1-2.0 wt. %, more particularly 0.01-1.0 wt. % or 0.3-0.8 wt. %. An optional second metal selected from Pd, Ni, Re, Ru, Ir, Sn, or a combination thereof as a Group 6 to 10 and Group 14 metal may be present, in an amount of 0.01-5.0 wt. % or 0.01-2.0 wt. %, or 0.1-2.0 wt. %, more particularly 0.01-1.0 wt. % and 0.01-1.5 wt. %.

The modifier metals content in the catalyst composition may be varied over useful ranges, e.g., the total modifying metals content for the catalyst may be 0.01-5.0 wt. % or 0.01-2.0 wt. %, or 0.1-2.0 wt. % (total catalyst weight basis). In some instances, the catalyst composition comprises 0.1-2.0 wt. % Pt as one of the modifying metals and 0.01-1.5 wt. % of a second metal selected from Groups 6 to 10 and Group 14, or 0.3-1.0 wt. % Pt and 0.03-1.0 wt. % second metal, or 0.3-1.0 wt. % Pt and 0.03-0.8 wt. % second metal. In some cases, the ratio of the first Group 10 metal to the optional second metal selected from Groups 6 to 10 and Group 14 may be in the range of 5:1 to 1:5, or 3:1 to 1:3, or 1:1 to 1:2, or 5:1 to 2:1, or 5:1 to 3:1, or 1:1 to 1:3, or 1:1 to 1:4. In more specific cases, the catalyst composition comprises 0.01 to 5.0 wt. % of the modifying metal, 1 to 99 wt. % of the matrix material, and 0.1 to 99 wt. % of the combined SSZ-91 molecular sieve and the rare earth modified alumina content. In some cases, the is rare earth modified alumina is present in an amount of from 5-85 wt. % of the catalyst composition and the total molecular sieve content is in the range of about 25-85 wt. % of the catalyst composition.

The base extrudate may be made according to any suitable method. For example, the base extrudates for the first and/or second catalyst compositions may be conveniently made by mixing the components together and extruding the well mixed SSZ-91 molecular sieve and rare earth modified alumina mixture to form the base extrudate. The extrudate is next dried and calcined, followed by loading of any modifiers onto the base extrudate. Suitable impregnation techniques may be used to disperse the modifiers onto the base extrudate. The method of making the base extrudate is not intended to be particularly limited according to specific process conditions or techniques, however.

While not limited thereto, exemplary process conditions may include cases wherein the SSZ-91 molecular sieve, the rare earth modified alumina, any added matrix material and any added liquid are mixed together at about 20 to 80° C. for about 0.5 to 30 min.; the extrudate is formed at about 20 to 80° C. and dried at about 90-150° C. for 0.5-8 hrs; the extrudate is calcined at 260-650° C. (500-1200° F.), in the presence of sufficient air flow, for 0.1-10 hours; the extrudate is impregnated with a modifier by contacting the extrudate with the metal impregnation solution containing at least one modifier for 0.1-10 hrs at a temperature in the range of about 20 to 80° C.; and the metal loaded extrudate is dried at about 90-150° C. for 0.1-10 hrs and calcined at 260-650° C. (500-1200° F.), in the presence of sufficient air flow, for 0.1-10 hours.

The hydrocarbon feed may generally be selected from a variety of base oil feedstocks, and advantageously comprises gas oil; vacuum gas oil; long residue; vacuum residue; atmospheric distillate; heavy fuel; oil; wax and paraffin; used oil; deasphalted residue or crude; charges resulting from thermal or catalytic conversion processes; shale oil; cycle oil; animal and vegetable derived fats, oils and waxes; petroleum and slack wax; or a combination thereof. The hydrocarbon feed may also comprise a feed hydrocarbon cut in the distillation range from 400–1300° F., or 500-1100° F., or 600-1050° F., and/or wherein the hydrocarbon feed has a KV100 (kinematic viscosity at 100° C.) range from about 3 to 30 cSt or about 3.5 to 15 cSt.

In some cases, the process may be used advantageously for a light or heavy neutral base oil feedstock, such as a vacuum gas oil (VGO), as the hydrocarbon feed where the SSZ-91 and rare earth modified alumina catalyst composition includes a Pt modifying metal, or a combination of Pt with another modifier.

The product(s), or product streams, may be used to produce one or more base oil products, e.g., to produce multiple grades having a KV100 in the range of about 2 to 30 cSt. Such base oil products may, in some cases, have a pour point of not more than about −12° C., or −15° C., or −20° C.

The hydroisomerization catalyst and process may also be combined with additional process steps, or system components, e.g., the feedstock may be further subjected to hydrotreating conditions with a hydrotreating catalyst prior to contacting the hydrocarbon feedstock with the hydroisomerization catalyst composition, optionally, wherein the hydrotreating catalyst comprises a guard layer catalyst comprising a refractory inorganic oxide material containing about 0.1 to 1 wt. % Pt and about 0.2 to 1.5 wt. % Pd.

Among the advantages provided by the present process and hydroisomerization catalyst, are the improvement in noble metal dispersion produced using the combination of the SSZ-91 molecular sieve and the rare earth modified alumina, as compared with the same process wherein only an SSZ-91 catalyst composition is used. For example, the noble metal dispersion may be increased by at least about 2%, or 4%, or 8%, or 10%, when the combination of the SSZ-91 molecular sieve and the rare earth modified alumina is used in the catalyst composition, as compared with the use, in the same process, of only an SSZ-91 molecular sieve in the catalyst composition.

In practice, hydrodewaxing is used primarily for reducing the pour point and/or for reducing the cloud point of the base oil by removing wax from the base oil. Typically, dewaxing uses a catalytic process for processing the wax, with the dewaxer feed is generally upgraded prior to dewaxing to increase the viscosity index, to decrease the aromatic and heteroatom content, and to reduce the amount of low boiling components in the dewaxer feed. Some dewaxing catalysts accomplish the wax conversion reactions by cracking the waxy molecules to lower molecular weight molecules. Other dewaxing processes may convert the wax contained in the hydrocarbon feed to the process by wax isomerization, to produce isomerized molecules that have a lower pour point than the non-isomerized molecular counterparts. As used herein, isomerization encompasses a hydroisomerization process, for using hydrogen in the isomerization of the wax molecules under catalytic hydroisomerization conditions.

Suitable hydrodewaxing conditions generally depend on the feed used, the catalyst used, desired yield, and the desired properties of the base oil. Typical conditions include a temperature of from 500° F. to 775° F. (260° C. to 413° C.); a pressure of from 15 psig to 3000 psig (0.10 MPa to 20.68 MPa gauge); a LHSV of from 0.25 $hr^{-1}$ to 20 $hr^{-1}$; and a hydrogen to feed ratio of from 2000 SCF/bbl to 30,000 SCF/bbl (356 to 5340 $m^3$ $H_2/m^3$ feed). Generally, hydrogen will be separated from the product and recycled to the isomerization zone. Generally, dewaxing processes of the present invention are performed in the presence of hydrogen.

Typically, the hydrogen to hydrocarbon ratio may be in a range from about 2000 to about 10,000 standard cubic feet $H_2$ per barrel hydrocarbon, and usually from about 2500 to about 5000 standard cubic feet $H_2$ per barrel hydrocarbon. The above conditions may apply to the hydrotreating conditions of the hydrotreating zone as well as to the hydroisomerization conditions of the first and second catalyst. Suitable dewaxing conditions and processes are described in, e.g., U.S. Pat. Nos. 5,135,638; 5,282,958; and 7,282,134.

While the method and catalyst system and processes of use have been generally described in terms of the hydroisomerization catalyst composition comprising the SSZ-91 molecular sieve and the rare earth modified alumina, it should be understood that additional catalysts, including layered catalysts and treatment steps may be present, e.g., including, hydrotreating catalyst(s)/steps, guard layers, and/or hydrofinishing catalyst(s)/steps.

The invention should be considered to include all embodiments, aspects, variations and equivalents within the scope of, and as set forth in, the following numbered P1 to P21 paragraphs:

P1. A method for making a hydroisomerization catalyst, which is useful to make dewaxed products including base oils, the method comprising mixing an SSZ-91 molecular sieve with a rare earth metal modified alumina and, optionally, a refractory inorganic oxide carrier precursor, to form a mixture, wherein the mixture has an SSZ-91 molecular sieve content in the range of about 5 to about 80 wt. %;

forming a shaped particulate material from the mixture and drying the particulate material;

calcining the dried particulate material;

contacting the calcined particulate material with a solution comprising a Group 8-10 metal compound to form a catalyst precursor material and drying the catalyst precursor material; and calcining the dried catalyst precursor material to form a hydroisomerization catalyst.

P2. The method of P1, wherein the SSZ-91 molecular sieve comprises ZSM-48 type zeolite material, the molecular sieve having:

at least 70% polytype 6 of the total ZSM-48-type material;

an EUO-type phase in an amount of between 0 and 3.5 percent by weight; and polycrystalline aggregate morphology comprising crystallites having an average aspect ratio of between 1 and 8.

P3. The method of any one of P1 and P2, wherein the refractory inorganic oxide carrier precursor is selected from matrix materials and/or mixtures of matrix materials selected from silica, alumina, ceria, titania, magnesia, or a combination thereof.

P4. The method of any one of P1 to P3, wherein the refractory inorganic oxide carrier precursor is selected from matrix materials and/or mixtures of matrix materials selected from alumina, silica-alumina or a combination thereof.

P5. The method any one of P1 to P4, wherein the rare earth metal is selected from lanthanum, cerium, praseodymium, neodymium, promethium, samarium, europium, gadolinium, terbium, dysprosium, holmium, erbium, thulium, ytterbium, lutetium, scandium, yttrium, or a combination thereof.

P6. The method any one of P1 to P5, wherein the alumina is selected from boehmite, pseudoboehmite, γ-alumina, η-alumina, θ-alumina, δ-alumina, χ-alumina, or a mixture thereof.

P7. The method of any one of P1 to P6, wherein the alumina is boehmite, pseudoboehmite, γ-alumina, θ-alumina, or a mixture thereof.

P8. The method any one of P1 to P7, wherein the alumina comprises boehmite, pseudoboehmite, or γ-alumina.

P9. The method any one of P1 to P8, wherein the rare earth metal modified alumina has one or more of the following characteristics: a surface area in the range of 100-300 $m^2/g$, or 110-250 $m^2/g$, or 120-200 $m^2/g$; a pore volume in the range of 2.5-105 nm pore diameter range of 0.6-2.0 cc/g, or 0.65-1.8 cc/g, or 0.7-1.5 cc/g, or a combination thereof.

P10. The method any one of P1 to P9, wherein the rare earth metal modified alumina is a lanthanum modified boehmite or γ-alumina having a lanthanum content in the range of about 1-20 wt. % or 1.5-15 wt. % or 2-10 wt. %.

P11. The method any one of P1 to P10, wherein the lanthanum modified alumina has one or more of the following characteristics: a surface area in the range of 100-300 $m^2/g$, or 110-250 $m^2/g$, or 120-200 $m^2/g$; a pore volume in the range of 2.5-105 nm pore diameter range of 0.6-2.0 cc/g, or 0.65-1.8 cc/g, or 0.7-1.5 cc/g, or a combination thereof.

P12. The method any one of P1 to P11, wherein the shaped particulate material is in the form of a powder, granule, molded product, or an extrudate.

P13. The method any one of P1 to P12, wherein the shaped particulate material is an extrudate that is dried at a temperature in the range of about 90-150° C. and calcined at a temperature in the range of about 260-650° C.

P14. The method any one of P1 to P13, wherein the solution comprising the Group 8-10 metal compound comprises a Group 8-10 metal selected from cobalt, nickel, palladium, platinum, or a combination thereof.

P15. The method any one of P1 to P14, wherein the calcined particulate material is contacted with the solution at a temperature in the range of about 20-80° C. for about 0.1-2 hrs.

P16. The method any one of P1 to P5, wherein the catalyst precursor material is dried at a temperature in the range of about 90-150° C. and calcined at a temperature in the range of about 260-650° C.

P17. The method any one of P1 to P6, wherein the hydroisomerization catalyst comprises about 0-85 wt. % of the refractory inorganic oxide carrier, about 5-85 wt. % of the rare earth metal modified alumina, a total molecular sieve content of about 25-85 wt. %, a total active metal content of about 0.1-1.0 wt. %, and a total promoter content of about 0-10 wt. %.

P18. A method for improving noble metal dispersion and thermal stability in a hydroisomerization catalyst comprising an SSZ-91 molecular sieve, the method comprising forming the hydroisomerization catalyst according to the method of any one of P1 to P17.

P19. The method of P18, wherein the noble metal dispersion is increased by at least about 2%, or 4%, or 8%, or 10% as compared with a catalyst comprising the same SSZ-91 molecular sieve, the same refractory inorganic oxide carrier precursor, and the same alumina that differs only in that the alumina is not modified with the rare earth metal.

P20. A hydroisomerization catalyst that is made according to the method of any one of P1 to P19.

P21. A process for making a base oil product, the process comprising contacting a base oil feedstock with the hydroisomerization catalyst of P20 under hydroisomerization conditions.

EXAMPLES

SSZ-91 was synthesized according to U.S. Pat. No. 10,618,816. The aluminas were provided as Catapal® aluminas and Pural® aluminas from Sasol or Versal® aluminas from UOP. The SSZ-91 molecular sieve had a silica-alumina ratio (SAR) of 120 or less.

Rare earth modified aluminas were obtained from a commercially-available source (e.g., Sasol, Kaiyong, PIDC). Representative lanthanum modified aluminas were used as the rare earth modified aluminas in the hydroisomerization catalysts. These La-doped aluminas are characterized as having the properties of Table 1.

TABLE 1

Lanthanum Modified Aluminas

| La-doped Alumina Property | LAL 1 | LAL 2 |
|---|---|---|
| $La_2O_3$, wt. % | 4 | 4 |
| BET Surface Area, $m^2/g$ | 85-110 | 130-190 |
| Pore volume, cc/g | 0.6-0.8 | 0.7-0.9 |
| Alumina Phase | θ | γ |

Metal dispersion was assessed using hydrogen chemisorption measurements. The metal dispersion describes the ratio of the number of active metal atoms available for reaction to the total number of metal atoms in the catalyst material. The metal percent dispersion is the ratio of the available quantity to total quantity of active molecules times 100%. Weak adsorption is termed reversible adsorption, whereas strong chemisorption is termed irreversible adsorption. The total chemisorption is the combination of weak and strong adsorption.

The metal dispersion was determined using the following procedure: the catalyst was first calcined under He and reduced under Hydrogen. After the catalyst was evacuated for 60 min., the catalyst was held under vacuum until the total $H_2$ chemisorption was measured at 35° C. for pressures of 20, 40, 60, 80, and 100 torr. After the total chemisorption was measured the catalyst was evacuated for 10 min., the isothermal $H_2$ chemisorption was repeated to determine the weak and strong $H_2$ chemisorption components. Metal dispersion for all samples was normalized to the strong chemisorption determined for the example A1 catalyst.

Example A1—Hydroisomerization Catalyst A1 Preparation

Hydroisomerization catalyst A1 (comparative) was prepared as follows: crystallite SSZ-91 was composited with Sasol Catapal® alumina to provide a mixture containing 65 wt. % SSZ-91 zeolite. The mixture was extruded, dried, and calcined. The dried and calcined extrudate was impregnated with a solution containing platinum and calcined at 343° C. The overall platinum loading was 0.6 wt. %.

Example A2—Hydroisomerization Catalyst A2 Preparation

Hydroisomerization catalyst A2 (comparative) was prepared under the same conditions as used for catalyst A1 and calcined at 371° C.

Example A3—Hydroisomerization Catalyst A3 Preparation

Hydroisomerization catalyst A3 (comparative) was prepared under the same conditions as used for Catalyst A1 and calcined at 399° C.

Example A4—Hydroisomerization Catalyst A4 Preparation

Hydroisomerization catalyst A4 (comparative) was prepared under the same conditions as used for Catalyst A1 and calcined at 427° C.

Example A5—Hydroisomerization Catalyst A5 Preparation

Hydroisomerization catalyst A5 (comparative) was prepared under the same conditions as used for Catalyst A1 and calcined at 482° C.

Example A6—Hydroisomerization Catalyst A6 Preparation

Hydroisomerization catalyst A6 (comparative) was prepared under the same conditions as used for Catalyst A1 and calcined at 538° C.

Example B7—Hydroisomerization Catalyst B7 Preparation

Hydroisomerization catalyst B7 was prepared as follows: crystallite SSZ-91 was composited with Sasol Catapal® alumina and 17.5 wt. % of La-modified alumina LAL1 to provide a mixture containing 65 wt. % SSZ-91 zeolite. The mixture was extruded, dried, and calcined under the same conditions as used for catalyst A1. The dried and calcined extrudate was impregnated with a solution containing platinum and calcined at 343° C. The overall platinum loading was 0.6 wt. %.

Example B8—Hydroisomerization Catalyst B8 Preparation

Hydroisomerization catalyst B8 was prepared under the same conditions as used for catalyst B7 and calcined at 399° C.

Example B9—Hydroisomerization Catalyst B9 Preparation

Hydroisomerization catalyst B9 was prepared under the same conditions as used for Catalyst B9 and calcined at 482° C.

Example C10—Hydroisomerization Catalyst C10 Preparation

Hydroisomerization catalyst C10 was prepared as follows: crystallite SSZ-91 was composited with Sasol Catapal® alumina and 17.5 wt. % of La-modified alumina LAL2 to provide a mixture containing 65 wt. % SSZ-91 zeolite. The mixture was extruded, dried, and calcined under the same conditions as used for catalyst A1. The dried and calcined extrudate was impregnated with a solution containing platinum and calcined at 343° C. The overall platinum loading was 0.6 wt. %.

Example C11—Hydroisomerization Catalyst C11 Preparation

Hydroisomerization catalyst C11 was prepared under the same conditions as used for catalyst C10 and calcined at 399° C.

Example C12—Hydroisomerization Catalyst CU Preparation

Hydroisomerization catalyst CU was prepared under the same conditions as used for Catalyst C10 and calcined at 427° C.

Example C13—Hydroisomerization Catalyst C13 Preparation

Hydroisomerization catalyst C13 was prepared under the same conditions as used for Catalyst C10 and calcined at 482° C.

Example C14—Hydroisomerization Catalyst C14 Preparation

Hydroisomerization catalyst C14 was prepared under the same conditions as used for Catalyst C10 and calcined at 538° C.

Example D15—Hydroisomerization Catalyst D15 Preparation

Hydroisomerization catalyst D15 was prepared as follows: crystallite SSZ-91 was composited with Sasol Catapal® alumina and 35 wt. % of La-modified alumina LAL2 to provide a mixture containing 45 wt. % SSZ-91 zeolite. The mixture was extruded, dried, and calcined under the same conditions as used for catalyst A1. The dried and calcined extrudate was impregnated with a solution containing platinum and calcined at 399° C. The overall platinum loading was 0.6 wt. %.

Example E—Catalyst Noble Metal Dispersion

The normalized Pt dispersion was determined for each of the catalysts of comparative examples A1-A6 and inventive examples B7-B9, C10-C14 and D15. Table 2 summarizes the results.

TABLE 2

Catalyst Noble Metal Dispersion Results

| Example | Normalized Pt Dispersion (%) at Calcination Temperature (° C.) | | | | | |
| --- | --- | --- | --- | --- | --- | --- |
| | 343° C. | 371° C. | 399° C. | 427° C. | 482° C. | 538° C. |
| A1 | 100 | — | — | — | — | — |
| A2 | — | 101 | — | — | — | — |
| A3 | — | — | 99 | — | — | — |
| A4 | — | — | — | 96 | — | — |
| A5 | — | — | — | — | 59 | — |
| A6 | — | — | — | — | — | 35 |
| B7 | 103 | — | — | — | — | — |
| B8 | — | — | 103 | — | — | — |
| B9 | — | — | — | — | 74 | — |
| C10 | 109 | — | — | — | — | — |
| C11 | — | — | 115 | — | — | — |
| C12 | — | — | — | 113 | — | — |
| C13 | — | — | — | — | 108 | — |
| C14 | — | — | — | — | — | 87 |
| D15 | — | — | 97 | — | — | — |

The results shown in Table 2 demonstrate that the addition of a rare earth modified (e.g., La-doped) alumina improves the noble metal dispersion and thermal stability. When the calcination temperature increases, the metal dispersion retention is much better for the La-doped catalysts. Table 3 provides a summary of the relative improvement for catalysts C10 to C14 compared with comparative (base case) catalysts A1 to A6. For example, at a catalyst calcination temperature of 343° C., the La-doped catalysts show improved metal dispersion of approximately +9%. It is also noted that as the calcination temperature increases, the improvement in metal dispersion increased significantly. For example, at calcination temperatures of 482° C. and above (i.e., catalyst C13 and C14), the metal dispersion is about 50% higher than the comparative A5 and A6 catalysts that did not include a rare earth modified alumina.

TABLE 3

Catalyst Noble Metal Dispersion Based on Calcination Temperature

| Examples | Pt Dispersion Change Relative to Comparative Catalysts at Calcination Temperature (° C.) | | | | | |
| --- | --- | --- | --- | --- | --- | --- |
| | 343° C. | 371° C. | 399° C. | 427° C. | 482° C. | 538° C. |
| A1-A6 | Base | Base | Base | Base | Base | Base |
| C10-C14 | +9% | — | +16% | +17% | +49% | +52% |

The foregoing description of one or more embodiments of the invention is primarily for illustrative purposes, it being recognized that variations might be used which would still incorporate the essence of the invention. Reference should be made to the following claims in determining the scope of the invention.

For the purposes of U.S. patent practice, and in other patent offices where permitted, all patents and publications cited in the foregoing description of the invention are incorporated herein by reference to the extent that any information contained therein is consistent with and/or supplements the foregoing disclosure.

What is claimed is:

1. A method for making a hydroisomerization catalyst, which is useful to make dewaxed products including base oils, the method comprising
    mixing an SSZ-91 molecular sieve with a rare earth metal modified alumina and, optionally, a refractory inorganic oxide carrier precursor, to form a mixture, wherein the mixture has an SSZ-91 molecular sieve content in the range of about 5 to about 80 wt. %;
    forming a shaped particulate material from the mixture and drying the particulate material;
    calcining the dried particulate material;
    contacting the calcined particulate material with a solution comprising a Group 8-10 metal compound to form a catalyst precursor material and drying the catalyst precursor material; and
    calcining the dried catalyst precursor material to form a hydroisomerization catalyst.

2. The method of claim 1, wherein the SSZ-91 molecular sieve comprises ZSM-48 type zeolite material, the molecular sieve having:
    at least 70% polytype 6 of the total ZSM-48-type material;
    an EUO-type phase in an amount of between 0 and 3.5 percent by weight; and
    polycrystalline aggregate morphology comprising crystallites having an average aspect ratio of between 1 and 8.

3. The method of claim 1, wherein the refractory inorganic oxide carrier precursor is selected from matrix materials and/or mixtures of matrix materials selected from silica, alumina, ceria, titania, magnesia, or a combination thereof.

4. The method of claim 1, wherein the refractory inorganic oxide carrier precursor is selected from matrix materials and/or mixtures of matrix materials selected from alumina, silica-alumina or a combination thereof.

5. The method of claim 1, wherein the rare earth metal is selected from lanthanum, cerium, praseodymium, neodymium, promethium, samarium, europium, gadolinium, terbium, dysprosium, holmium, erbium, thulium, ytterbium, lutetium, scandium, yttrium, or a combination thereof.

6. The method of claim 1, wherein the alumina is selected from boehmite, pseudoboehmite, γ-alumina, η-alumina, θ-alumina, δ-alumina, χ-alumina, or a mixture thereof.

7. The method of claim 6, wherein the alumina comprises boehmite, pseudoboehmite, or γ-alumina.

8. The method of claim 7, wherein the rare earth metal modified alumina has one or more of the following characteristics: a surface area in the range of 100-300 $m^2/g$, or 110-250 $m^2/g$, or 120-200 $m^2/g$; a pore volume in the range of 2.5-105 nm pore diameter range of 0.6-2.0 cc/g, or 0.65-1.8 cc/g, or 0.7-1.5 cc/g, or a combination thereof.

9. The method of claim 7, wherein the rare earth metal modified alumina is a lanthanum modified boehmite or γ-alumina having a lanthanum content in the range of about 1-20 wt. % or 1.5-15 wt. % or 2-10 wt. %.

10. The method of claim 9, wherein the lanthanum modified alumina has one or more of the following characteristics: a surface area in the range of 100-300 $m^2/g$, or 110-250 $m^2/g$, or 120-200 $m^2/g$; a pore volume in the range of 2.5-105 nm pore diameter range of 0.6-2.0 cc/g, or 0.65-1.8 cc/g, or 0.7-1.5 cc/g, or a combination thereof.

11. The method of claim 1, wherein the alumina is boehmite, pseudoboehmite, γ-alumina, θ-alumina, or a mixture thereof.

12. The method of claim 1, wherein the shaped particulate material is in the form of a powder, granule, molded product, or an extrudate.

13. The method of claim 1, wherein the shaped particulate material is an extrudate that is dried at a temperature in the range of about 90-150° C. and calcined at a temperature in the range of about 260-650° C.

14. The method of claim 1, wherein the solution comprising the Group 8-10 metal compound comprises a Group 8-10 metal selected from cobalt, nickel, palladium, platinum, or a combination thereof.

15. The method of claim 1, wherein the calcined particulate material is contacted with the solution at a temperature in the range of about 20-80° C. for about 0.1-2 hrs.

16. The method of claim 1, wherein the catalyst precursor material is dried at a temperature in the range of about 90-150° C. and calcined at a temperature in the range of about 260-650° C.

17. The method of claim 1, wherein the hydroisomerization catalyst comprises about 0-85 wt. % of the refractory inorganic oxide carrier, about 5-85 wt. % of the rare earth metal modified alumina, a total molecular sieve content of about 25-85 wt. %, a total active metal content of about 0.1-1.0 wt. %, and a total promoter content of about 0-10 wt. %.

18. A method for improving noble metal dispersion and thermal stability in a hydroisomerization catalyst comprising an SSZ-91 molecular sieve, the method comprising forming the hydroisomerization catalyst according to the method of claim 1.

19. The method of claim 18, wherein the noble metal dispersion is increased by at least about 2%, or 4%, or 8%, or 10% as compared with a catalyst comprising the same SSZ-91 molecular sieve, the same refractory inorganic oxide carrier precursor, and the same alumina that differs only in that the alumina is not modified with the rare earth metal.

20. A hydroisomerization catalyst that is made according to the method of claim 1.

21. A process for making a base oil product, the process comprising contacting a base oil feedstock with the hydroisomerization catalyst of claim 20 under hydroisomerization conditions.

* * * * *